US007986638B2

United States Patent
Ho et al.

(10) Patent No.: US 7,986,638 B2
(45) Date of Patent: *Jul. 26, 2011

(54) METHOD TO DYNAMICALLY CREATE A VIRTUAL NETWORK

(76) Inventors: Chi Fai Ho, Palo Alto, CA (US); Shin Cheung Simon Chiu, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/769,064

(22) Filed: Apr. 28, 2010

(65) Prior Publication Data

US 2010/0208619 A1    Aug. 19, 2010

Related U.S. Application Data

(63) Continuation of application No. 11/228,868, filed on Sep. 15, 2005, now Pat. No. 7,733,802.

(51) Int. Cl.
*H04L 12/28* (2006.01)
*G06F 15/177* (2006.01)

(52) U.S. Cl. .................. 370/254; 370/351; 709/220

(58) Field of Classification Search .................. 370/254, 370/255, 351, 352, 357; 709/220–222
See application file for complete search history.

(56) References Cited

U.S. PATENT DOCUMENTS

| | | | | |
|---|---|---|---|---|
| 5,572,528 | A * | 11/1996 | Shuen | 370/402 |
| 5,802,286 | A * | 9/1998 | Dere et al. | 709/220 |
| 5,892,912 | A * | 4/1999 | Suzuki et al. | 370/395.53 |
| 6,088,333 | A * | 7/2000 | Yang et al. | 370/238 |
| 6,272,540 | B1 * | 8/2001 | Yadav et al. | 709/223 |
| 6,522,629 | B1 * | 2/2003 | Anderson, Sr. | 370/236 |
| 6,842,463 | B1 * | 1/2005 | Drwiega et al. | 370/468 |
| 6,891,842 | B2 * | 5/2005 | Sahaya et al. | 370/401 |
| 7,027,412 | B2 * | 4/2006 | Miyamoto et al. | 370/255 |
| 7,310,524 | B2 * | 12/2007 | Kurokawa | 455/426.2 |
| 2002/0176377 | A1* | 11/2002 | Hamilton | 370/328 |
| 2004/0210623 | A1* | 10/2004 | Hydrie et al. | 709/201 |
| 2004/0243705 | A1* | 12/2004 | Netravali et al. | 709/225 |
| 2005/0066035 | A1* | 3/2005 | Williams et al. | 709/226 |
| 2006/0114842 | A1* | 6/2006 | Miyamoto et al. | 370/255 |

* cited by examiner

*Primary Examiner* — Hong Cho

(74) *Attorney, Agent, or Firm* — North Shore Patents, P.C.; Michele Liu Baillie

(57) ABSTRACT

A method creates a virtual network dynamically, with automated configuration for the new virtual network to function. The virtual network creation is initiated by a network node sending a request for a virtual network to a network controller. The network controller services the request, creating the virtual network by automatically configuring at least one network switch in the physical network. The network controller automatically determines a configuration for the virtual network using virtual network information, and creates the virtual network by configuring network switches according to the configuration. The virtual network can be configured for particular applications. From a user's point of view, the user connects to a network node. The network node then initiates the creation of the virtual network transparently to the user. The resource-intensive manual configurations of the conventional approach in creating new virtual networks are thus avoided.

31 Claims, 7 Drawing Sheets

METHOD TO DYNAMICALLY CREATE A VIRTUAL NETWORK

CROSS-REFERENCE TO RELATED APPLICATIONS

The present application is a continuation of U.S. patent application entitled "Method to Dynamically Create a Virtual Network", Ser. No. 11/228,868, filed on Sep. 15, 2005.

BACKGROUND OF THE INVENTION

1. Field

This invention relates generally to data communication, and more specifically to a method to create a virtual network.

2. Related Art

The proliferation of wireless local area network (WLAN) has changed drastically data communications among computers and among network appliances. Home networks and networks for small businesses are adopting WLAN technologies at a phenomenal rate. Part of the reason is the affordable pricing of WLAN equipment, and part of the reason is the ease of installation and configuration.

The popularity of WLAN does not come without its own challenges. WLAN employs WiFi technologies and a public un-licensed spectrum of frequencies. Since the spectrum allows only a handful of channels, as specified in WiFi standards, sharing the spectrum among networks becomes a headache. Currently, each WLAN supports one or more pre-configured Service Set Identity (SSID), allowing multiple networks to co-exist in the same WLAN. The pre-configured networks allow a network node to easily join an existing network. A network node would discover these pre-configured networks and chooses to join one of the networks.

However, if a user wants to create a new virtual network connecting a plurality of network nodes such that they do not interfere with existing pre-configured networks. The user needs to use a new SSID. Further, the user has to manually configure all the related WLAN networking equipment to recognize the new SSID. Moreover, in order for the new WLAN virtual network to inter-network with other WLAN virtual networks and external networks, the user has, in addition, to configure other networks to recognize the new virtual network. The daunting tasks of such configurations run opposite to the wisdom of wireless and mobility. A user should be able to create a network on the fly and to dissemble the network with ease.

The above illustrates a need for a method to create a WLAN virtual network dynamically, with automated configuration for the new WLAN virtual network to function. The present invention addresses such a need.

BRIEF SUMMARY OF THE INVENTION

A method creates a virtual network dynamically, with automated configuration for the new virtual network to function. The virtual network creation is initiated by a network node sending a request for a virtual network to a network controller. The network controller services the request, creating the virtual network by automatically configuring at least one network switch in the physical network. The network controller automatically determines a configuration for the virtual network using virtual network information, and creates the virtual network by configuring network switches according to the configuration. The virtual network can be configured for particular applications. From a user's point of view, the user connects to a network node. The network node then initiates the creation of the virtual network transparently to the user. The resource-intensive manual configurations of the conventional approach in creating new virtual networks are thus avoided.

DETAILED DESCRIPTION OF THE INVENTION

The method in accordance with the present invention creates a virtual network dynamically, with automated configuration for the new virtual network to function. The virtual network creation is initiated by a network node sending a request for a virtual network to a network controller. The network controller services the request, creating the virtual network by automatically configuring at least one network switch in the physical network. The resource-intensive manual configurations of the conventional approach in creating new virtual networks are avoided.

Figure 1:
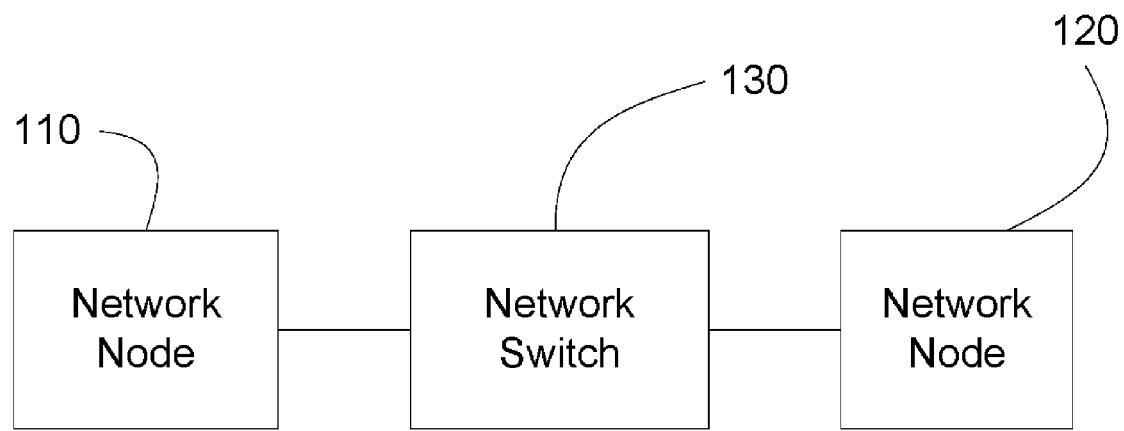
FIG. 1 illustrates a virtual network in accordance with the present invention.

FIG. 1 illustrates a virtual network in accordance with the present invention. A virtual network includes a network switch 130 and a plurality of network nodes 110, 120. A network node 110 communicates with another network node 120 by sending and receiving network packets. A network node 110 sends network packets to a network switch 130, and receives network packets from a network switch 130. If one network node 110, sending network packets, and another network node 120, receiving network packets, connect to a same network switch 130, the network switch 130 switches network packets received from network node 110 to network node 120.

In one embodiment, a virtual network is based on wired communication technologies such as Ethernet. In another embodiment, a virtual network is based on wireless communication technologies such as radio frequency technology. Other types of communication technologies are possible.

A configuration for a virtual network includes virtual network properties. In one embodiment, virtual network properties include a network name, or derive a network name. In one embodiment, virtual network properties include security information such as an encryption key. In one embodiment, virtual network properties include quality of services, bandwidth parameters, classes of services. In one embodiment, a network switch 130 requires configuration for a virtual network in order for the network switch 130 to process network packets in the virtual network.

Any network node 110, 120 may connect to a plurality of virtual networks and other networks. Network packets for different virtual networks may have different network names.

Figure 2:
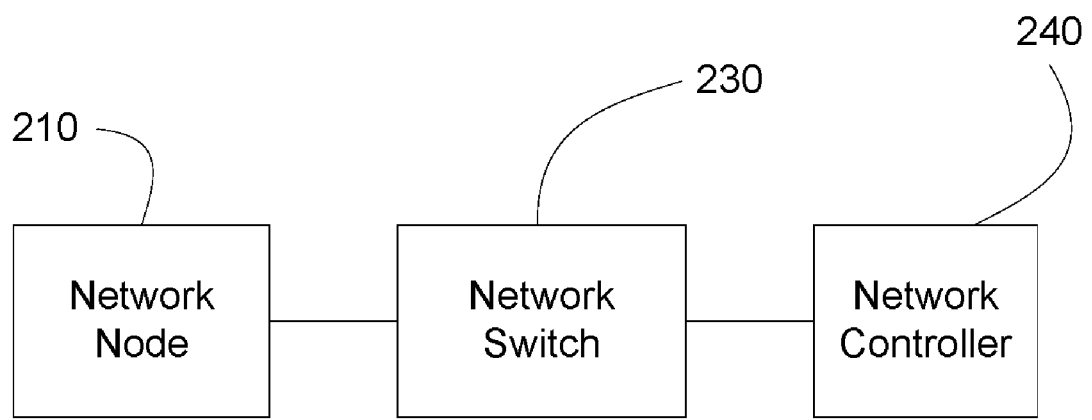
FIG. 2 illustrates a process for creating a virtual network in accordance with the present invention.

FIG. 2 illustrates a process for creating a virtual network in accordance with the present invention. A network node 210 initiates a process to create a virtual network by sending a request for a virtual network creation. A network switch 230 receives the request and sends the request to a network controller 240. In one embodiment, the request includes virtual network information. Virtual network information includes any information required by the network controller 240 to configure and create the requested virtual network, such as network name, network usage or network configuration, etc. In one embodiment, network controller 240 prompts network node 210 for virtual network information. The network controller 240 then services the request.

In one embodiment, network controller 240 determines the virtual network requested does not exist, and proceeds to create the virtual network. In another embodiment, network controller 240 examines the virtual network information in the request, and proceeds to create the virtual network without first determining if the virtual network requested exists.

In creating the virtual network, network controller 240 determines the configuration for the virtual network. In one embodiment, virtual network information includes the configuration. In another embodiment, network controller 240 uses virtual network information to determine the configuration. In another embodiment, network controller 240 determines the configuration using information provided by a network database (not shown).

Network controller 240 configures network switch 230 using the configuration. The configuration may include one or more virtual network properties described above. After configuration, network switch 230 can accept network packets of the virtual network. Network controller 240 then replies to network node 210. Network node 210 receives the response from network controller 240 and can then also send network packets onto the virtual network.

Figure 3:
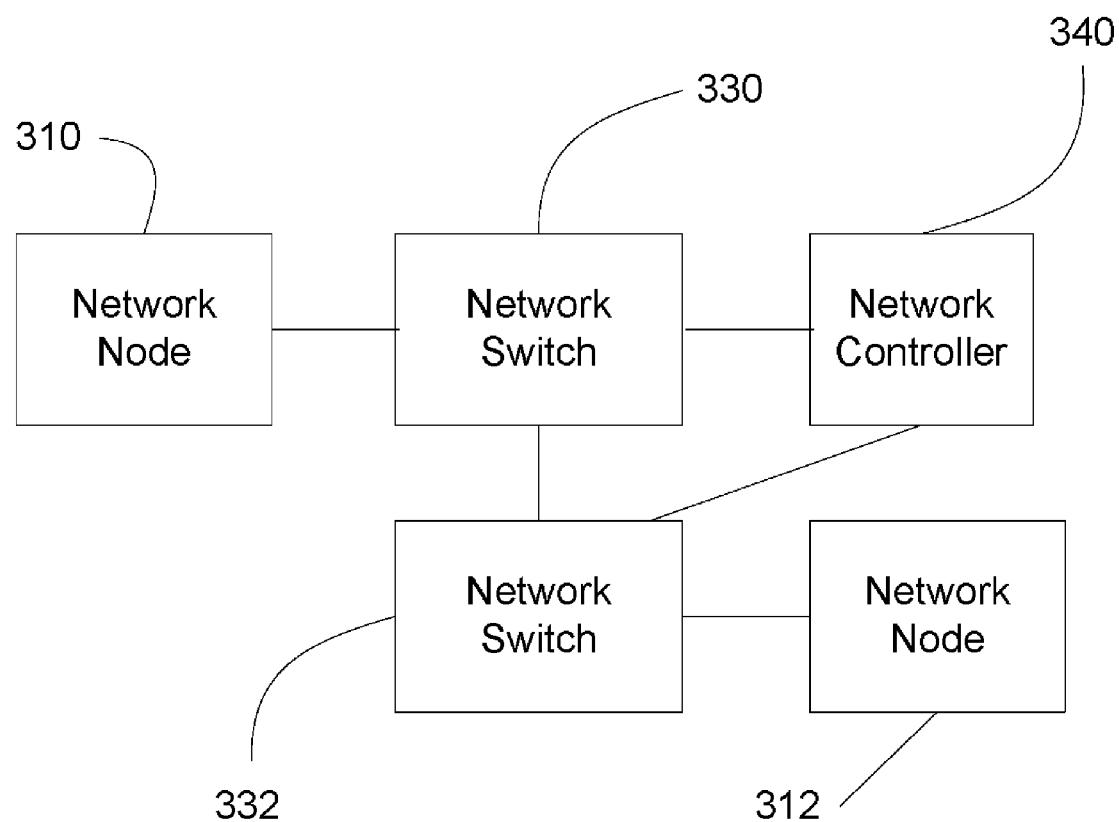
FIG. 3 illustrates a process for creating a virtual network with a plurality of network switches in accordance with the present invention.

FIG. 3 illustrates a process for creating a virtual network with a plurality of network switches in accordance with the present invention. A network node 310 initiates a process to create a virtual network. A network switch 330 receives the request and sends the request to a network controller 340. In one embodiment, the request includes virtual network information as defined above. In one embodiment, network controller 340 prompts network node 310 for virtual network information. The network controller 340 then services the request.

In one embodiment, network controller 340 determines the virtual network requested does not exist, and proceeds to create the virtual network. In another embodiment, network controller 340 examines the virtual network information in the request, and proceeds to create the virtual network without first determining if the virtual network requested exists.

In creating the virtual network, network controller 340 determines the configuration for the virtual network. In one embodiment, virtual network information includes the configuration. In another embodiment, network controller 340 uses virtual network information to determine the configuration. In another embodiment, network controller 340 determines the configuration using information provided by a network database (not shown).

Illustrated in FIG. 3, the plurality of network switches includes network switches 330 and 332. Network controller 340 configures network switches 330 and 332 using the configuration. The configuration may include one or more virtual network properties described above. Network controller 340 may configure other network switches (not shown) as well depending on the configuration. After configuration, network switches 330 and 332 can accept network packets of the virtual network. Network controller 340 then replies to network node 310. Network node 310 receives the response from the network controller, and can start sending network packets onto the virtual network. Similarly, a network node 312 connected to network switch 332 can send network packets onto the virtual network. Network nodes 310 and 312 can communicate with each other via network switches 330 and 332.

Figure 4:
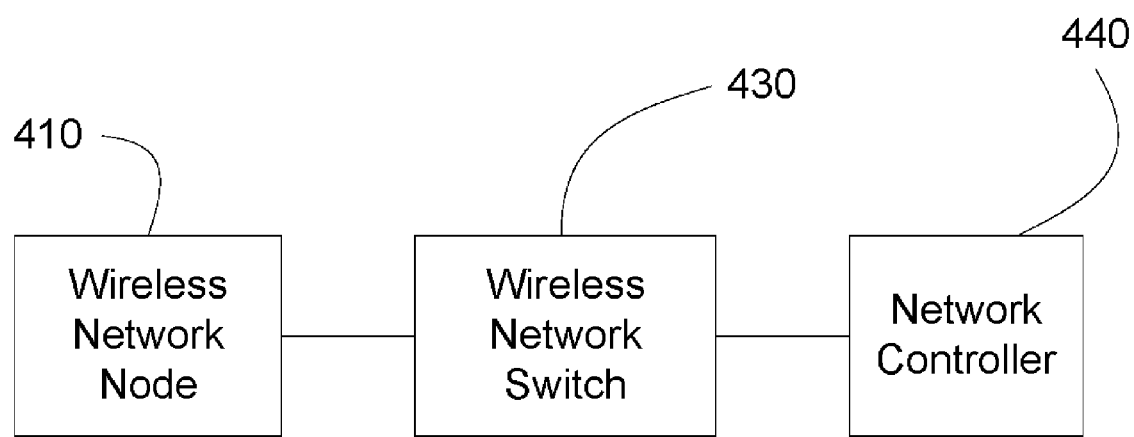
FIG. 4 illustrates a process for creating a virtual wireless network in accordance with the present invention.

FIG. 4 illustrates a process for creating a virtual wireless network in accordance with the present invention. A wireless network node 410 connects to a wireless network switch 430 through a wireless means, for example radio frequency communication channels. A wireless network node 410 initiates a process to create a virtual wireless network by sending a request for a virtual wireless network creation, using a configured communication channel to a network controller 440. In one embodiment, the configured communication channel includes network switch 430. In another embodiment, the configured communication channel is a wired means such as Ethernet. In one embodiment, the request includes virtual wireless network information as defined above. In one embodiment, network controller 440 prompts wireless network node 410 for virtual wireless network information. The network controller 440 then services the request.

In one embodiment, network controller 440 determines the virtual wireless network requested does not exist, and proceeds to create the virtual wireless network. In another embodiment, network controller 440 examines the virtual wireless network information in the request, and proceeds to create the virtual wireless network without first determining if the virtual network requested exists.

In creating the virtual network, network controller 440 determines the configuration for the virtual wireless network. In one embodiment, virtual wireless network information includes the configuration. In another embodiment, network controller 440 uses virtual wireless network information to determine the configuration. In another embodiment, network controller 440 determines the configuration using information provided by a network database (not shown).

Network controller 440 configures wireless network switch 430 using the configuration. The configuration may include one or more virtual network properties described above. After configuration, wireless network switch 430 can accept network packets of the virtual wireless network. Network controller 440 then replies to wireless network node 410. Wireless network node 410 receives the response from network controller 440 and can send network packets onto the virtual wireless network.

Figure 5:
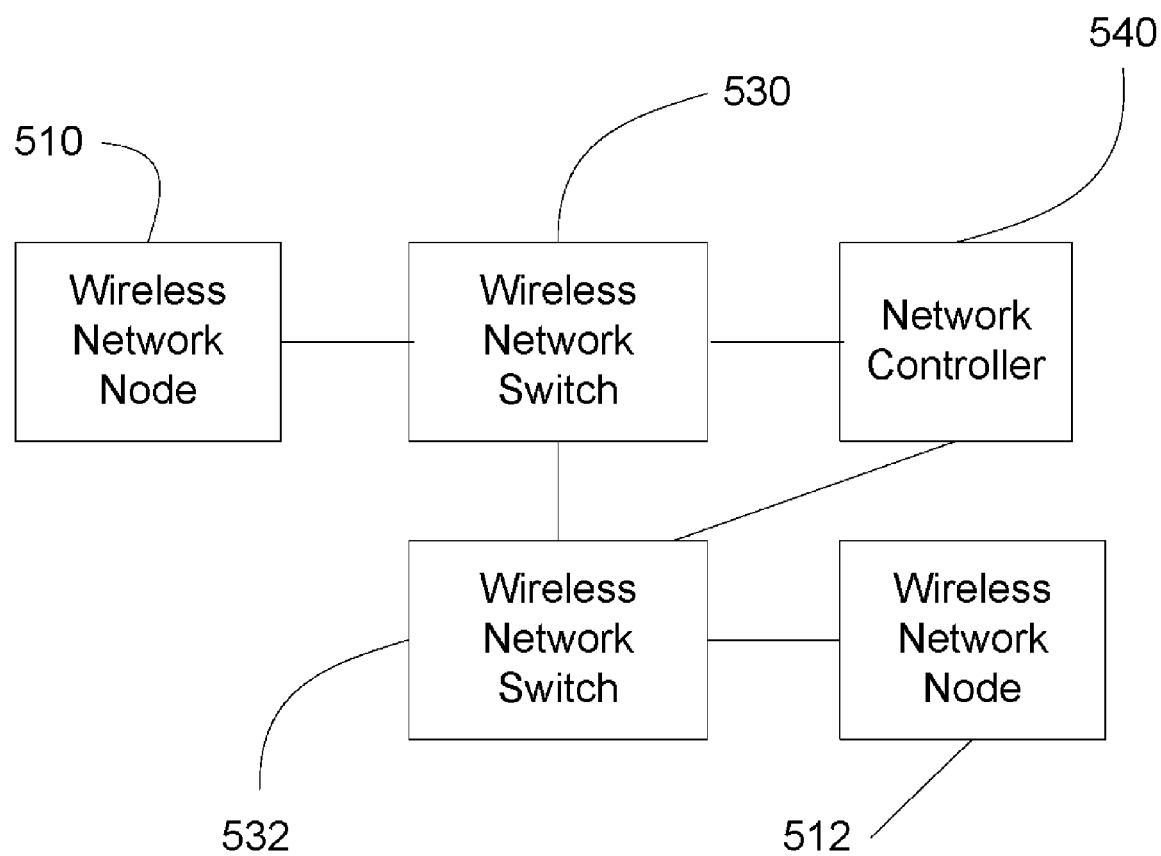
FIG. 5 illustrates a process for creating a virtual wireless network with a plurality of wireless network switches in accordance with the present invention.

FIG. 5 illustrates a process for creating a virtual wireless network with a plurality of wireless network switches in accordance with the present invention. A wireless network node 510 initiates a process to create a virtual wireless network by sending a request for a virtual wireless network creation, using a configured communication channel to a network controller 540. In one embodiment, the configured communication channel includes network switch 530. In another embodiment, the configured communication channel is a wired means such as Ethernet. In one embodiment, the request includes virtual wireless network information as defined above. In one embodiment, network controller 540 prompts wireless network node 510 for virtual wireless network information. The network controller 540 then services the request.

In one embodiment, network controller 540 determines the virtual wireless network requested does not exist, and proceeds to create the virtual wireless network. In another embodiment, network controller 540 examines the virtual wireless network information in the request, and proceeds to create the virtual wireless network without first determining if the virtual network requested exists.

In creating the virtual network, network controller 540 determines the configuration for the virtual wireless network. In one embodiment, virtual wireless network information includes the configuration. In another embodiment, network controller 540 uses virtual wireless network information to determine the configuration. In another embodiment, network controller 540 determines the configuration using information provided by a network database (not shown).

Illustrated in FIG. 5, the plurality of network switches includes wireless network switches 530 and 532. Network controller 540 configures wireless network switches 530 and 532 using the configuration. The configuration may include one or more virtual network properties described above. Network controller 540 may configure other network switches (not shown) as well depending on the configuration. After configuration, wireless network switches 530 and 532 can accept network packets of the virtual wireless network. Network controller 540 then replies to wireless network node 510. Wireless network node 510 receives the response from the network controller and can start sending network packets onto the virtual wireless network. Similarly, a wireless network node 512 connected to wireless network switch 532 can send network packets onto the virtual wireless network. Wireless network nodes 510 and 512 can communicate with each other via network switches 530 and 532.

In one embodiment, the wireless network is a home wireless network based on WiFi technology. The network name is a Service Set Identity (SSID). A wireless network switch includes an access point for the home wireless network. The home wireless network has an existing Service Set Identity (SSID). A wireless network node uses an existing SSID as a configured communication channel to send a request for a virtual wireless network creation to a network controller. The network controller determines a SSID of the virtual wireless network. The network controller configures the wireless network switches with the SSID of the virtual wireless network. After the wireless network node receives a response from the network controller, the wireless network node can send network packets to the virtual wireless network, using the SSID of the virtual wireless network.

Figure 6:
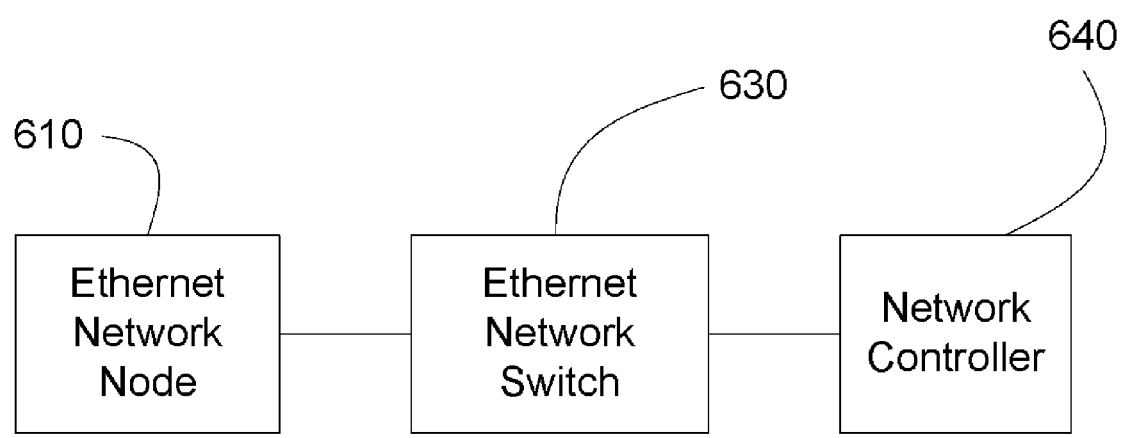
FIG. 6 illustrates a process for creating a virtual Ethernet network in accordance with the present invention.

FIG. 6 illustrates a process for creating a virtual Ethernet network in accordance with the present invention. An Ethernet network node 610 connects to an Ethernet network switch 630 through an Ethernet connection. In one embodiment, the network name of a virtual Ethernet network is a Virtual Local Area Network Identity (VLAN-ID). Ethernet network node 610 initiates a process to create a virtual Ethernet network by sending a request for a virtual Ethernet network creation, using the Ethernet connection as a configured communication channel to a network controller 640. In one embodiment, Ethernet network node 610 sends the request in an Ethernet broadcast message. In one embodiment, Ethernet network node 610 sends the Ethernet broadcast message using a specific VLAN-ID, e.g. VLAN-ID 0. In one embodiment, Ethernet network node 610 sends the request in an Ethernet unicast message using a specific Media Access Control (MAC) address for network creation. In one embodiment, Ethernet network node 610 sends the request in an Ethernet unicast message using a MAC address for network controller 640. In one embodiment, Ethernet network node 610 sends the request in an Internet Protocol (IP) message. In one embodiment, the IP message is an IP broadcast message. In one embodiment, the IP message is destined for network controller 640. In one embodiment, the request includes virtual Ethernet network information. In one embodiment, network controller 640 prompts Ethernet network node 610 for virtual Ethernet network information. The network controller 640 then services the request.

In one embodiment, network controller 640 determines the virtual Ethernet network requested does not exist, and proceeds to create the virtual Ethernet network. In another embodiment, network controller 640 examines the virtual Ethernet network information in the request, and proceeds to create the virtual Ethernet network without first determining if the virtual network requested exists. In creating the virtual network, network controller 640 determines the configuration for the virtual Ethernet network. In one embodiment, virtual Ethernet network information includes the configuration. In another embodiment, network controller 640 uses virtual Ethernet network information to determine the configuration. In another embodiment, network controller 640 determines the configuration using information provided by a network database (not shown).

Network controller 640 configures Ethernet network switch 630 using the configuration. The configuration may include one or more virtual network properties described above. After configuration, network controller 640 configures Ethernet network switch 630 with the VLAN-ID of the virtual Ethernet network. In one embodiment, Ethernet network switch 630 configures Ethernet network switch 630 with a VLAN mapping method. In one embodiment, the VLAN mapping method is based on MAC address mapping with network controller 640 configuring Ethernet network switch 630 with a MAC address of network node 610. In another embodiment, VLAN mapping method is based on port mapping with network controller 640 configuring Ethernet network switch 630 with the Ethernet port at Ethernet network switch 630 that connects to Ethernet network node 610. After configuration, Ethernet network switch 630 can accept network packets of the virtual Ethernet network. Network controller 640 then replies to Ethernet network node 610. Ethernet network node 610 receives the response from network controller 640 and can send network packets onto the virtual Ethernet network.

Figure 7:
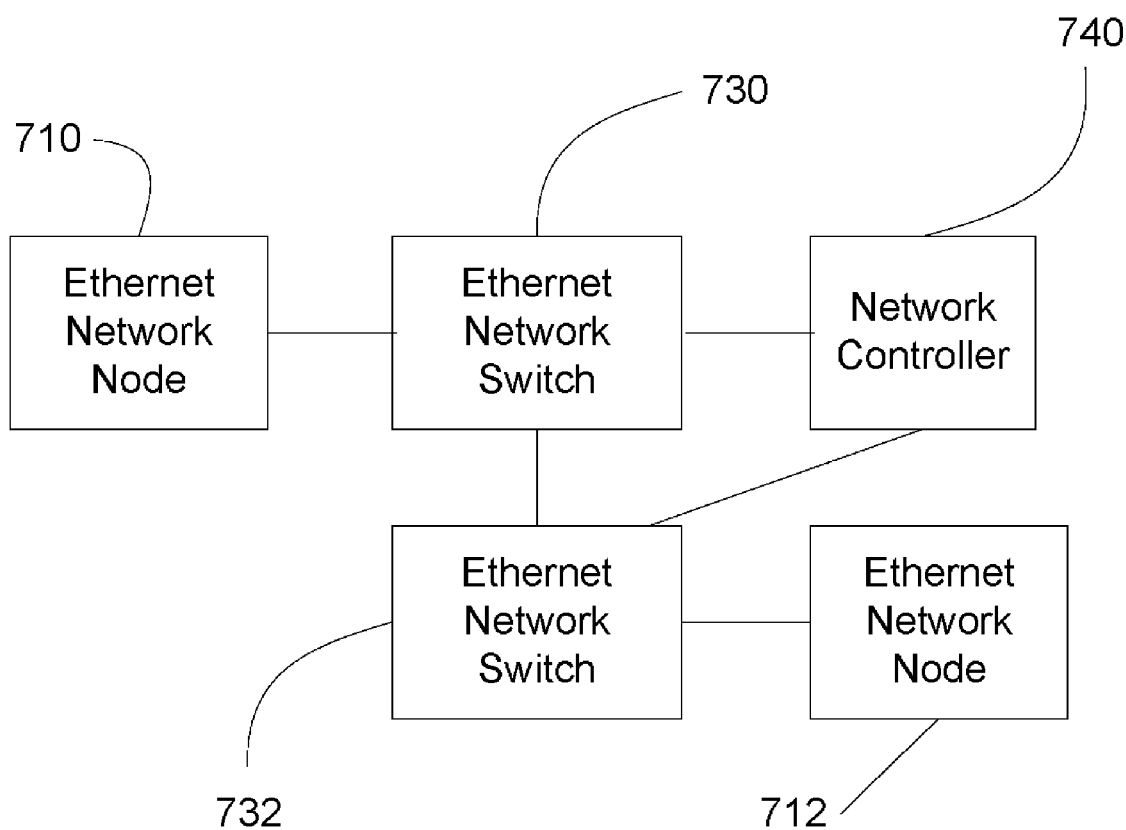
FIG. 7 illustrates a process for creating a virtual Ethernet network with a plurality of Ethernet network switches in accordance with the present invention.

FIG. 7 illustrates a process for creating a virtual Ethernet network with a plurality of Ethernet network switches in accordance with the present invention. An Ethernet network node 710 connects to an Ethernet network switch 730 through an Ethernet connection. Ethernet network node 710 initiates a process to create a virtual Ethernet network by sending a request for a virtual Ethernet network creation, using the Ethernet connection as a configured communication channel to a network controller 740. In one embodiment, Ethernet network node 710 sends the request in an Ethernet broadcast message. In one embodiment, Ethernet network node 710 sends the Ethernet broadcast message using a specific VLAN-ID, e.g. VLAN-ID 0. In one embodiment, Ethernet network node 710 sends the request in an Ethernet unicast message using a specific Media Access Control (MAC) address for network creation. In one embodiment, Ethernet network node 710 sends the request in an Ethernet unicast message using a MAC address for network controller 740. In another embodiment, Ethernet network node 710 sends the request in an Internet Protocol (IP) message. In one embodiment, the IP message is an IP broadcast message. In one embodiment, the IP message is destined for network controller 740. In one embodiment, the request includes virtual Ethernet network information. In one embodiment, network controller 740 prompts Ethernet network node 710 for virtual Ethernet network information. The network controller 740 then services the request.

In one embodiment, network controller 740 determines the virtual Ethernet network requested does not exist, and proceeds to create the virtual Ethernet network. In another embodiment, network controller 740 examines the virtual Ethernet network information in the request, and proceeds to create the virtual Ethernet network without first determining if the virtual network requested exists. In creating the virtual network, network controller 740 determines the configuration for the virtual Ethernet network. In one embodiment, virtual Ethernet network information includes the configuration. In another embodiment, network controller 740 uses virtual Ethernet network information to determine the configuration. In another embodiment, network controller 740 determines the configuration using information provided by a network database (not shown).

Illustrated in FIG. 7, the plurality of network switches includes Ethernet network switches 730 and 732. Network controller 740 configures Ethernet network switches 730 and 732 using the configuration. The configuration may include one or more virtual network properties described above. Network controller 740 may configure other Ethernet network switches (not shown) as well depending on the configuration. Network controller 740 configures Ethernet network switch 730 in a similar manner as illustrated in FIG. 6. Network controller 740 configures Ethernet network switch 732 with the VLAN-ID of the virtual Ethernet network. In one embodiment, network controller 740 configures additional capabilities of Ethernet network switches 730 and 732 for the VLAN-ID. After configuration, Ethernet network switches 730 and 732 can accept network packets of the virtual Ethernet network. Network controller 740 then replies to Ethernet network node 710. Ethernet network node 710 receives the response from the network controller and can start sending network packets onto the virtual Ethernet network. Similarly, an Ethernet network node 712 connected to Ethernet network switch 732 can also send network packets onto the virtual Ethernet network. Ethernet network nodes 710 and 712 can communicate with each other via Ethernet network switches 730 and 732.

The configuration can be based on the application for the virtual network. For example, a wireless network node can create a virtual wireless network for a music application. The virtual wireless network for the music application connects a plurality of wireless network nodes related to the music application. For example, a wireless network node related to the music application can be a music player, a juke box, a music library system, a speaker, a music disk player, a music disk burner, or a music boom box.

For another example, a wireless network node can create a virtual wireless network connecting wireless network nodes related to a video application. Other examples include, a virtual wireless network created for a pictures and images application. In one embodiment, a wireless network node creates a virtual wireless network for kitchen appliances, and a virtual wireless network to allow communication among wireless network nodes from the same manufacturer, of the same brand, or purchased from the same retailer. There can be a plurality of different virtual wireless networks for the music application, the video application, pictures and images application or kitchen appliances.

After a virtual network is created, a network switch can record statistics of the virtual network traffic through the network switch. The statistics include the number of network packets of the virtual network, total number of bytes of network packets of the virtual network, number of discarded network packets, number of invalid network packets, or other numbers useful for network monitoring and network analysis. Some or all network switches in the virtual network can record statistics.

A network controller also can record accounting information about a virtual network. The accounting information includes the time of creation of the virtual network, the statistics of the virtual network traffic, and/or the duration of the virtual network. The network controller determines a plurality of network switches to record the statistics of the virtual network traffic. The network controller collects the statistics from the network switches. The network controller may collect the statistics frequently or periodically from the network switches.

Optionally, the network controller collects the statistics when the virtual network is released. A network controller computes the duration of a virtual network by knowing the creation time and the released time of the virtual network. In one embodiment, the network controller determines a virtual network is released when the network controller receives a release request for the virtual network, or when the network controller determines the virtual network is no longer in use. In one scenario, a network node in the virtual network sends a release request to the network controller. In another scenario, a network switch sends an indication that the virtual network is no longer in use, when the network switch determines that there is no more network traffic in the virtual network. In this embodiment, the network controller determines a virtual network is no longer in use when all network switches in the virtual network indicate that the virtual network is no longer in use. In another embodiment, the network controller determines the virtual network is no longer in use by monitoring the statistics collected from the network switches. In one embodiment, the network controller determines the virtual network is no longer in use at a pre-determined time, or at a fixed duration of time after the virtual network is created.

The accounting information of a virtual network can be used to generate a usage report of the virtual network and/or used to generate billing information.

For example, virtual networks can be created in a multi-tenant unit, such as an office building or a business park. A virtual network service provider offers virtual network services to tenants of a multi-tenant unit. The virtual network service provider operates a plurality of network switches and a plurality of network controllers. A tenant operates a plurality of network nodes, which use the virtual network services by creating a virtual network, sending traffic on the virtual network. The tenant may create a plurality of virtual networks at different locations in the multi-tenant unit, or at different times. The network controllers create the virtual networks and collect accounting information about the virtual networks. The virtual network service provider generates billing statements from the accounting information. The virtual network service provider can generate billing statements on a monthly basis or can generate a billing statement on each virtual network used by the tenant.

For another example, a virtual network service provider can offer virtual network service to clients. A virtual network service can be offered in a public space such as a concert hall, a stadium, or a park. A virtual network service provider operates a plurality of network switches and a plurality of network controllers. A client operates a plurality of network nodes. When a client wants to use virtual network service for an event such as a concert, a ball game, or a social gathering, the client uses the network nodes to create one or more virtual networks among network nodes belonging to the client. The network nodes exchange network packets. The virtual network service provider generates a billing statement for the client from accounting information collected by the network controller. The virtual network service provider can generate a billing statement for the client for the virtual networks used by the client, or generate a billing statement for an event.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for dynamically creating a new virtual network comprising:
   (a) receiving a request by a network controller for creating the new virtual network, wherein the request is sent by a network node;
   (b) determining a new virtual network name for the new virtual network;
   (c) creating the new virtual network by the network controller by configuring a network switch with the new virtual network name, wherein the network switch is different from the network node; and
   (d) sending a reply from the network controller to the network node, wherein the new virtual network includes the network node after the network node receives the reply, wherein after receiving the reply, the network node sends packets for the new virtual network to the configured network switch using the new virtual network name.

2. The method of claim 1, wherein the request is sent by the network node to the network controller via the network switch.

3. The method of claim 1, wherein the reply from the network controller comprises the new virtual network name.

4. The method of claim 1, wherein the network switch comprises the network controller.

5. The method of claim 1, wherein the new network name comprises a Service Set Identity (SSID).

6. The method of claim 1, wherein the creating (c) comprises:
   (c1) configuring the network switch with one or more of the following: quality of services, bandwidth parameters, or class of services.

7. The method of claim 1, wherein the new virtual network is configured for a virtual network application.

8. The method of claim 7, wherein the virtual network application comprises one or more of the following: a music application; a video application; a pictures and images application; a network of devices from a same manufacturer; a network of devices with a same brand; or a network of devices purchased from a same retailer.

9. A method for providing a dynamic network service, comprising:
   (a) receiving a request for creating a new virtual network for the network service from a network node through a network switch different from the network node;
   (b) determining a new network name for the new virtual network;
   (c) configuring the network switch with the new network name;
   (d) sending a reply to the network node, wherein after receiving the reply, the network node sends packets to the network switch using the new network name; and
   (e) generating an accounting statement using accounting information for the new virtual network.

10. The method of claim 9, wherein the network service comprises one or more of the following: a multi-tenant building network service; a business network service; an office building network service; a public event network service; a wireless network service; or an Ethernet network service.

11. The method of claim 9, wherein the generating (e) comprises:
   (e1) collecting network statistics for the new virtual network from the network switch; and
   (e2) generating the accounting statement using the network statistics.

12. The method of claim 9, wherein the accounting information comprises one or more of the following: billing information; or time information.

13. The method of claim 12, wherein the time information comprises one or more of the following: a creation time for the new virtual network; or a release time for the new virtual network.

14. A system, comprising:
   a network controller for automatically creating a new virtual network;
   a network node coupled to the network controller, wherein the network node sends a request to the network controller for creating the new virtual network, wherein the network controller determines a new virtual network name for the new virtual network; and
   a network switch different from the network node, wherein the network switch is configured with the new virtual network name by the network controller,
   wherein the network controller sends a reply to the network node, wherein the new virtual network includes the network node after the network node receives the reply, wherein after receiving the reply, the network node sends packets for the new virtual network to the configured network switch using the new virtual network name.

15. The system of claim 14, wherein the network node sends the request to the network controller via the network switch.

16. The system of claim 14, wherein the reply from the network controller comprises the new virtual network name.

17. The system of claim 14, wherein the network switch comprises the network controller.

18. The system of claim 14, wherein the new network name comprises a Service Set Identity (SSID).

19. The system of claim 14, wherein the network controller configures the network switch with one or more of the following: quality of services, bandwidth parameters, or class of services.

20. The system of claim 14, wherein the new virtual network is configured for a virtual network application.

21. The system of claim 20, wherein the virtual network application comprises one or more of the following: a music application; a video application; a pictures and images application; a network of devices from a same manufacturer; a network of devices with a same brand; or a network of devices purchased from a same retailer.

22. The system of claim 14, wherein the network controller creates the new virtual network for a network service, wherein the network service comprises one or more of the following: a multi-tenant building network service; a business network service; an office building network service; a public event network service; a wireless network service; or an Ethernet network service.

23. The system of claim 14, wherein the network controller further generates an accounting statement using accounting information for the new virtual network.

24. The system of claim 23, wherein the network controller collects network statistics for the new virtual network from the network switch and generates the accounting statement using the network statistics.

25. The system of claim 23, wherein the accounting information comprises one or more of the following: billing information; or time information.

26. The system of claim 25, wherein the time information comprises one or more of the following: a creation time for the new virtual network; or a release time for the new virtual network.

27. A non-transitory computer readable medium having a computer readable program, wherein the computer readable program when executed on a computer causes the computer to:
receive a request for creating the new virtual network, wherein the request is sent by a network node;
determine a new virtual network name for the new virtual network;
create the new virtual network by configuring a network switch with the new virtual network name, wherein the network switch is different from the network node; and
send a reply to the network node, wherein the new virtual network includes the network node after the network node receives the reply, wherein after receiving the reply, the network node sends packets for the new virtual network to the configured network switch using the new virtual network name.

28. A non-transitory computer readable medium having a computer readable program, wherein the computer readable program when executed on a computer causes the computer to:
receive a request for creating a new virtual network for the network service from a network node through a network switch different from the network node;
determine a new network name for the new virtual network;
configure the network switch with the new network name;
send a reply to the network node, wherein after receiving the reply, the network node sends packets to the network switch using the new network name; and
generate an accounting statement using accounting information for the new virtual network.

29. A non-transitory computer readable medium having a computer readable program, wherein the computer readable program when executed on a computer causes the computer to:
receive a request for creating the new virtual network, wherein the request is sent by a network node;
determine a configuration of at least one network switch for the new virtual network using information provided by a source other than the network node that sent the request, wherein the configuration comprises a new virtual network name for the new virtual network;
automatically create the new virtual network by configuring the at least one network switch according to the configuration without configuring the network node; and
in response to creating the new virtual network, send a reply to the network node that sent the request, wherein the new virtual network includes the network node that sent the request after the network node receives the reply, wherein after receiving the reply, the network node sends packets for the new virtual network using the new virtual network name to the configured network switch.

30. A non-transitory computer readable medium having a computer readable program, wherein the computer readable program when executed on a computer causes the computer to:
send a request by a network node for creating the new virtual network, wherein the request is received by a network controller, wherein the network controller determines a configuration of at least one network switch for the new virtual network using information provided by a source other than the network node that sent the request, wherein the configuration comprises a new virtual network name for the new virtual network, wherein the network controller automatically creates the new virtual network by configuring the at least one network switch according to the configuration without configuring the network node;
receive, by the network node that sent the request, a reply sent from the network controller in response to creating the new virtual network, wherein the new virtual network includes the network node that sent the request after the reply is received; and
after receiving the reply, send by the network node packets for the new virtual network using the new virtual network name to the configured network switch.

31. A non-transitory computer readable medium having a computer readable program, wherein the computer readable program when executed on a computer causes the computer to:
receive a request for creating the new virtual wireless network, wherein the request is sent by a network node;
determine a new Service Set Identity (SSID) of at least one network switch for the new virtual wireless network;
automatically create the new virtual wireless network by configuring the at least one network switch using the new SSID of the new virtual wireless network without configuring the network node;
in response to creating the new virtual wireless network, send a reply to the network node, wherein the new virtual wireless network includes the network node after the network node receives the reply, wherein after receiving the reply, the network node sends packets using the SSID for the new virtual wireless network to the configured network switch;
receive information from the at least one network switch of the new virtual wireless network that there is no more traffic on the new virtual wireless network; and
in response to receiving the information, automatically release the virtual wireless network.

* * * * *